United States Patent [19]

Matsuura et al.

[11] 3,962,204

[45] June 8, 1976

[54] METHOD FOR THE PREPARATION OF POLYOLEFINS

[75] Inventors: Kazuo Matsuura, Kawasaki; Nobuyuki Kuroda; Toru Nakamura, both of Yokohama; Mituji Miyoshi, Kanagawa, all of Japan

[73] Assignee: Nippon Oil Company Ltd., Tokyo, Japan

[22] Filed: May 16, 1974

[21] Appl. No.: 470,514

[30] Foreign Application Priority Data
May 21, 1973  Japan................................ 48-55526

[52] U.S. Cl............................... 526/89; 252/429 C; 526/90; 526/154; 526/211; 526/213; 526/348; 526/349; 526/351; 526/352; 526/904; 526/905
[51] Int. Cl.$^2$...................... C08F 4/64; C08F 10/02
[58] Field of Search............ 260/88.2, 93.7, 94.9 DA

[56] References Cited
UNITED STATES PATENTS
3,642,760   2/1972   Backelmans et al........ 260/94.9 DA
3,644,318   2/1972   Diedrich et al............. 260/94.9 DA FOREIGN PATENTS OR APPLICATIONS
2,000,566   11/1970   Germany

*Primary Examiner*—Edward J. Smith

[57] ABSTRACT

This invention provides a method for the preparation of polyolefins by polymerizing or copolymerizing an olefin or olefins in the presence of a catalyst composed of a titanium compound and/or vanadium compound component supported on a solid carrier and an organometallic compound component, said solid carrier comprising a reaction product obtained by reacting (1) an aluminum compound represented by the general formula $Al(OOCR)(OR')_2$ wherein R and R' being the same or different each represent alkyl, aryl or aralkyl and (2) a magnesium compound represented by the general formula $Mg(OR')_2$ where R'' being the same as or different from R and/or R' is alkyl, aryl or aralkyl at a molar ratio of (1):(2) of substantially at least 2:1.

5 Claims, No Drawings

METHOD FOR THE PREPARATION OF POLYOLEFINS

BACKGROUND OF THE INVENTION

1. Field of the Invention

This invention relates to an olefin polymerization or copolymerization method by means of a novel polymerization catalyst. More particularly, it is concerned with a method for the preparation of polyolefins which comprises polymerizing or copolymerizing an olefin or olefins in the presence of a novel catalyst produced by supporting on a reaction product obtained by reacting (1) an aluminum compound represented by the general formula Al(OOCR)(OR')$_2$ wherein R and R' being the same or different each represent alkyl, aryl or aralkyl and (2) a magnesium compound represented by the general formula Mg(OR'')$_2$ wherein R'' being the same as or different from R and/or R' is alkyl, aryl or aralkyl at a molar ratio of (1):(2) of substantially at least 2:1 a titanium compound and/or a vanadium compound and subsequently activating the same with an organometallic compound or compounds.

2. Description of the Prior Art

It is well known in the prior art that combined systems of a titanium or vanadium compound and an organometallic compound of metals of Groups I - III in the Periodic Table are good catalysts for the olefin polymerization. However, these systems leave something to be improved in their polymerization activities being still low compared with the desired high one in the preparation of polyolefins. On the other hand, it is also known that catalyst systems composed of a titanium or vanadium compound, a component of Ziegler catalyst supported on a carrier of various magnesium compounds such as magnesium oxide, hydroxide and chloride are another class of good catalysts for the olefin polymerization. In this respect, a number of studies have recently been made of the use of a variety of metal compounds including magnesium ones as the carrier.

SUMMARY OF THE INVENTION

After an extensive investigation of method for the preparation of catalyst-supporting carriers of this nature, we have now found that reaction products obtained by reacting (1) an aluminum compound represented by the general formula Al(OOCR)(OR'')$_2$ wherein R and R' being the same or different each represent alkyl, aryl or aralkyl and (2) a magnesium compound represented by the general formula Mg(OR'')$_2$ wherein R'' being the same as or different from R and/or R' is alkyl, aryl or aralkyl under certain specific conditions can be excellent novel carriers for the preparation of olefin polymerization catalysts. The present invention is based upon the finding.

Catalysts produced by supporting on the solid carrier prepared as above a titanium compound and/or a vanadium compound and subsequently activating the same with an organometallic compound or compounds are so high in polymerization activity that partial pressure of the monomer is low during the polymerization, which proceeds in a very short period of time and the residual catalyst in the polymer thus formed is in a very small amount, thereby enabling elimination of the catalyst removal step. There is thus provided a very economical method for the preparation of polyolefins with moderate polymerization conditions and simplified conditions for the polymer processing accompanied. Surprisingly, the process for producing polyolefins according to the invention, which results in a very small amount of residual catalyst in the polymer even in the absence of a catalyst removal step, makes it possible to remarkably improving the disadvantages in the prior art molded products such as development of fish eye, and breakage and opacity.

DESCRIPTION OF THE INVENTION

Details and characteristics of the present invention will be apparent by the descriptions hereinbelow.

The first step of the preparation of catalysts according to the invention is reaction of (1) an aluminum compound represented by the general formula Al(OOCR)(OR')$_2$ wherein R and R' being the same or different each represent alkyl, aryl or aralkyl and (2) a magnesium compound represented by the general formula Mg(OR')$_2$ where R'' being the same as or different from R and/or R' is alkyl, aryl or aralkyl. The reaction is carried out under such conditions that the molar ratio of (1):(2) is substantially at least 2:1 and the organic carboxylic esters are eliminated. For example, the reaction is conveniently conducted in the presence of an inert solvent, although it may be done in the absence of a solvent. Whereas the molar ratio of (1):(2) may be chosen in such a manner that the aluminum compound is present in an excess over 2:1, it is desirable in such a case to remove the unreacted material by washing with an inert solvent or by distillation. The reaction is preferably effected at a molar ratio of (1):(2) from 2:1 to 5:1.

The inert solvent used as the solvent is not critical, which is often an aliphatic, aromatic or alicyclic hydrocarbon such as hexane, heptane, octane, benzene, toluene, xylene or decaline. The reaction temperature is desirably an elevated one in a range between 50° and 500°C. and especially 100°C. or higher. Temperatures around 200°C. are often employed. The reaction time is not critical but as the reaction between the two components will not satisfactorily proceed in a too short period of time, it is usually preferable to carry out the reaction for a period of time in a range from 1 hour to 20–30 hours.

Although chemical structure of the solid carrier obtained by the aforementioned method for use in this invention has not definitely been elucidated, it is assumed from the atomic ratio of aluminum magnesium of about 2:1 that the carrier contains as the main component a compound of the general formula

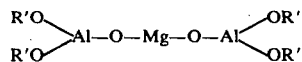

As the aluminum compounds suitable for use in the present invention, which are aluminum compounds represented by the general formula Al(OOCR)(OR')$_2$ wherein R and R' being the same or different each represent alkyl, aryl or aralkyl, are mentioned, for example, dimethoxyaluminum monoacetate, diethoxyaluminum monoacetate, diisopropoxyaluminum monoacetate, di-n-propoxyaluminum monoacetate, di-n-butoxyaluminum monoacetate, di-sec-butoxyaluminum monoacetate, di-t-butoxyaluminum monoacetate and diphenoxyaluminum monoacetate and mono saturated aliphatic carboxylic salts of the above-mentioned dialkoxyaluminum compound such as the monopropionate and the monobutyrate and mono aromatic carboxylic salts of the above-mentioned dialkoxyaluminum compound such as the mononaphthenate and the monobenzoate.

The magnesium compounds, which are magnesium compounds represented by the general formula $Mg(OR'')_2$ wherein $R''$ being the same as or different from R and/or R' is alkyl, aryl or aralkyl, include, for example, a variety of magnesium alkoxides such as magnesium dimethoxide, diethoxide, diisopropoxide, di-n-propoxide, di-n-butoxide, di-sec-butoxide, di-t-butoxide and diphenoxide, methoxyethoxy-, ethoxy-n-butoxy- and methoxyisopropoxymagnesium.

Known methods can be employed for supporting a titanium and/or a vanadium compound on the carrier prepared as above. For example, the magnesium and aluminum-containing carrier synthesized as above may be contacted under heating with a transition metal compound or compounds in the presence or absence of an inert solvent. It is convenient to heat the two at a temperature between 50° and 300°C. and preferably between 100° and 150°C. preferably in the absence of a solvent. The reaction time is not critical and usually 5 minutes or longer. The contact for a longer period of time may be made although it is not necessary. For example, the treatment time is from 5 to 10 minutes. Alternatively, contact of the two component may conveniently made by mechanical means such as use of a ball mill. The treatment, of course, should be conducted under oxygen-and moisture-free inert gas. The transition metal compound(s) may be used in the present invention in a proportion from 0.01 to 50 parts by weight per part by weight of the above-mentioned carrier. It is preferable to remove the excess transition metal halogenide(s) by washing with a solvent after the blending and heating treatment. The means by which the unreacted transition metal compounds after completion of the reaction is removed is not critical. Usually, washing of the catalyst with several portions of a solvent inert to Ziegler catalyst and evaporation of the washing under reduced pressure to yield a powdered are applied.

Olefin polymerization reaction using the catalyst according to the invention is carried out in the same way as the olefin polymerization reaction with a conventional Ziegler catalyst; the reaction is carried out throughout under oxygen- and moisture-free conditions. Other conditions under which the olefin polymerization is effected are a temperature in the range between 20° and 300°C. and preferably between 50° and 180°C. and a pressure in the range from ordinary one to 70 kg./cm.$^2$ and preferably from 2 to 60 kg./cm.$^2$ Whereas the molecular weight may be adjusted to some degree by varying polymerization conditions such as temperature and molar ratio of the catalyst, efficient adjustment is made by the addition of hydrogen to the polymerization system. Of course, two or more multi-step polymerization reaction with polymerization conditions such as hydrogen concentrations and polymerization temperature varied may be effected without any inconvenience using the catalyst according to the invention.

The method of the present invention can be applied to all the olefin polymerization polymerizable with Ziegler catalyst. For example, it is preferably employed for homopolymerization of $\alpha$-olefins such as ethylene, propylene and 1-butene as well as for copolymerization of ethylene and propylene, ethylene and 1-butene, propylene and 1-butene and the like.

The transition metal compound used in the present invention is a halogenide of titanium and/or vanadium. Illustrative are tetravalent titanium halogen compounds such as titanium tetrachloride, titanium tetrabromide, ethoxytitanium trichloride, diethoxytitanium dichloride, dibutoxytitanium dichloride and phenoxytitanium trichloride, trivalent titanium halogen compounds such as titanium trichloride and titanium trichloridealuminum trichloride complex, tetravalent vanadium halogen compounds such as vanadium tetrachloride, pentavalent vanadium compounds such as vanadium oxytrichloride and trivalent vanadium halogen compounds such as vanadium trichloride.

As the organometallic compound used in the invention may be employed organometallic compounds of metals of the Groups I–IV in the Periodic Table known as a component of Ziegler catalyst. Organoaluminum and organozinc compounds are particularly preferable. Illustrative are organoaluminum compounds represented by the general formulae $R_3Al$, $R_2AlX$, $RAlX_2$, $R_2AlOR$, $RAl(OR)X$ and $R_3Al_2X_3$ wherein R is alkyl or aryl and X is halogen and organozinc compounds represented by the general formula $R_2Z_n$ wherein R is alkyl such as triethylaluminum, triisobutylaluminum, trioctylaluminum, diethylaluminum chloride, ethylaluminum sesquichloride, diethylzinc and mixtures thereof. Amount of the organometallic compounds used in the invention is not critical. Usually, they may be used in amounts from 0.1 to 1000 moles per mole of the transition metal halogenide.

DESCRIPTION OF PREFERRED EMBODIMENTS

The following examples are given by way of illustration and are not to be considered as limitation of the invention.

EXAMPLE 1

Preparation of the catalyst.

To 100 ml. of decaline was added 22.4 g. (0.11 mol.) of $Al(OOCCH_3)(Oi-Pr)_2$ followed by addition of 5.7 g. (0.05 mol.) of $Mg(OEt)_2$. The mixture was heated with stirring at 160°C. for 4 hours and subsequently at 190° – 200°C. for 10 hours. Ester of low boiling temperature fractions formed as the reaction proceeds were removed by distillation and finally the solvent and the remaining light fractions were removed under reduced pressure to give a powdered solid. Al/Mg atomic ratio in the solid was 2.14.

To the solid was then added 80 ml. of titanium tetrachloride and the mixture was heated with stirring at 150°C. for 1 hour. The excess titanium tetrachloride was removed by decantation and washing with n-hexane was repeated until no titanium tetrachloride was detected in the washing. There was obtained a solid catalyst supporting 42 mg. of titanium per g. solid.

Polymerization

A 2-1-stainless steel autoclave equipped with an induction stirrer was purged with nitrogen and then charged with 1,000 ml. of hexane. In the autoclave were then placed 6 mmol. of tirethylaluminum and 38 mg. of the above-prepared solid catalyst and the content was heated with stirring to 90°C. The system was at a pressure of 2 kg./cm.$^2$ from vapor pressure of the hexane, into which hydrogen was introduced to a total pressure of 4.4 kg./cm$^2$ and then ethylene to a total pressure of 10 kg./cm$^2$ Polymerization was carried out for 15 min. while continuouly introducing ethylene. After completion of the polymerization, the polymer slurry was transferred to a beaker and the hexane was removed under reduced pressure to give 94 g. of a white polyethylene with a melt index of 0.33. Polymerization activity was 1770 g. polyethylene/g. solid.hr..C$_2$H$_4$ pressure, or 42020 g. polyethylene/g. Ti.hr..C$_2$H$_4$ pressure.

EXAMPLE 2

A catalyst was prepared in the same way as in Example 1 except that 7.1 g. (0.05 mol.) of Mg(Oi-C$_3$H$_7$)$_2$ was used in place of the Mg(OEt)$_2$ to give a catalyst supporting 49 mg. of Ti per g. solid. A polymerization was carried out for 15 min. in the same way as in Example 1 except that 62 mg. of the catalyst was employed to give 148 g. of a white polyethylene with a melt index of 0.30. Polymerization activity was 1710 g. polyethylene/g. solid.hr.C$_2$H$_4$ pressure, or 34800 g. polyethylene/g.Ti.hr..C$_2$H$_4$ pressure.

EXAMPLE 3

A catalyst was prepared in the same way as in Example 1 except that 195 g. of dibutoxy titanium dichloride was used in place of the titanium tetrachloride to give a catalyst supporting 52 mg. of titanium per g. solid. A polymerization was carried out for 15 min. in the same way as in Example 1 except that 29 mg. of the catalyst was used to give 67 g. of a white polyethylene with a melt index of 0.28. Polymerization activity was 1651 g. polyethylene/g.solid.hr..C$_2$H$_4$ pressure, or 31800 g. polyethylene/g.Ti.hr..C$_2$H$_4$ pressure.

EXAMPLE 4

A polymerization was carried out for 15 min. in the same way as in Example 1 except that 52 mg. of the catalyst prepared in Example 1 and 10 mmol. of diethylzinc in place of the triethylaluminum were used to give 78 g. of a white polyethylene with a melt index of 0.51. Polymerization activity was 1070 g. polyethylene/g.solid.hr..C$_2$H$_4$ pressure, or 25500 g. polyethylene/g.Ti.hr..C$_2$H$_4$ pressure.

EXAMPLE 5

A catalyst was prepared in the same way as in Example 1 except that vanadium tetrachloride was used in place of the titanium tetrachloride to give a catalyst supporting 38 mg. of vanadium per g. solid. A polymerization was carried out for 15 min. in the same way as in Example 1 except that 48 mg. of the catalyst was used to give 75 g. of polyethylene with a melt index of 0.11. Polymerization activity was 1120 g. polyethylene/g.solid.hr..C$_2$H$_4$ pressure, or 29500 g. polyethylene/g.solid.hr..C$_2$H$_4$ pressure.

EXAMPLE 6

A polymerization was carried out using 81 mg. of the catalyst prepared in Example 1, 5 mmol. of triethylaluminum and 1000 ml. of hexane. Hydrogen was introduced to a pressure of 1.5 kg./cm.$^2$ and then the reaction was carried out at 70°C. for 15 min. while supplying an ethylene-propylene gas mixture containing 2 mol.% propylene to maintain the pressure in the autoclave at 7 kg./cm.$^2$ There was obtained 147 g. of ethylene-propylene copolymer with a melt index of 2.8. Identification of the copolymer was made by means of infrared absorption spectrum. Catalyst activity was 1450 g. polyethylene/g.solid.hr..C$_2$H$_4$ pressure, or 34500 g. polyethylene/g.Ti.hr..C$_2$H$_4$ pressure.

| Example | Catalyst system Al compound | Mg compound | Transition Metal Oranometallic Compound | Amount of supported transition metal (mg./g.) | Amount of the solid used(mg.) | Time (min.) | Amount of the polymer(g.) |
|---|---|---|---|---|---|---|---|
| 1 | Al(OO(CH$_3$)(Oi-Pr)$_2$ | Mg(OEt)$_2$ | TiCl$_4$/Al(Et)$_3$ | 42 | 38 | 15 | 94 |
| 2 | '' | Mg(Oi-Pr)$_2$ | TiCl$_4$/Al(Et)$_3$ | 49 | 62 | 15 | 143 |
| 3 | as in Example 1 | Mg(OEt)$_2$ | Ti(OBu)$_2$Cl$_2$/Al(Et)$_3$ | 52 | 29 | 15 | 67 |
| 4 | '' | Mg(OEt)$_2$ | TiCl$_4$/Zn(Et)$_3$ | 42 | 52 | 15 | 78 |
| 5 | '' | Mg(OEt)$_2$ | VCl$_4$/Al(Et)$_3$ | 38 | 48 | 15 | 75 |
| 6 | '' | Mg(OEt)$_2$ | TiCl$_4$/Al(Et)$_3$ | 42 | 81 | 15 | 147 |

| Example | Polymerization activity per transition metal | per solid | MI |
|---|---|---|---|
| 1 | 42020 | 1770 | 0.33 |
| 2 | 34800 | 1710 | 0.30 |
| 3 | 31800 | 1651 | 0.28 |
| 4 | 25500 | 1070 | 0.51 |
| 5 | 29500 | 1120 | 0.11 |
| 6 | 34500 | 1450 | 2.8 |

We claim:

1. Method for the preparation of polyolefins by polymerizing or copolymerizing an olefin or olefins in the presence of a catalyst composed of a halogenide of a titanium compound and/or vanadium compound supported on a solid carrier and an organometallic compound of a metal of Groups I–IV of the Periodic Table, said solid carrier comprising a reaction product obtained by reacting (1) an aluminum compound represented by the general formula Al(OOCR) (OR')$_2$ wherein R and R' being the same or different each represent alkyl, aryl or aralkyl and (2) a magnesium compound represented by the general formula (Mg(OR'')$_2$ wherein R'' being the same as or different from R and/or R' is alkyl, aryl or aralkyl at a molar ratio of (1):(2) of substantially at least 2:1 at a temperature in the range from 50° to 500°C for 1 to 30 hours in the presence of an inert solvent.

2. Method according to claim 1 wherein said solid carrier is a reaction product obtained by reacting (1) said aluminum compound and (2) said magnesium compound at a molar ratio of (1):(2) between 2:1 and 5:1 at a temperature in the range from 50° to 500°C for 1 to 30 hours in the presence of an inert solvent.

3. Method according to claim 2 wherein the inert solvent is an aliphatic, aromatic or alicyclic hydrocarbon.

4. Method according to claim 1 wherein the olefin polymerization or copolymerization is carried out at a temperature in the range between 20° and 300°C and a pressure in the range between one and 70 kg./cm.$^2$.

5. Method according to claim 1 wherein the olefin polymerization or copolymerization is carried out in the presence of hydrogen added to the polymerization system.

* * * * *

UNITED STATES PATENT OFFICE
CERTIFICATE OF CORRECTION

PATENT NO. : 3,962,204
DATED : June 8, 1976
INVENTOR(S) : Matsuura et al.

It is certified that error appears in the above-identified patent and that said Letters Patent are hereby corrected as shown below:

In the Abstract, line 12, "$Mg(OR')_2$" should read as --$Mg(OR'')_2$--

Col. 1, line 19, "R'" should read as --R"--

Col. 2, line 20, "$Mg(OR')_2$" should read as --$Mg(OR'')_2$--

Col. 6, under the column Amount of the polymer(g), for Example 2, "143" should read as --148--

Signed and Sealed this

Nineteenth Day of October 1976

[SEAL]

Attest:

RUTH C. MASON
*Attesting Officer*

C. MARSHALL DANN
*Commissioner of Patents and Trademarks*